United States Patent Office 2,698,340
Patented Dec. 28, 1954

2,698,340

ORGANIC SULFIDE CATALYZED CONDENSATION REACTIONS

Joseph K. Mertzweiller, Baton Rouge, La., assignor to Standard Oil Development Company, a corporation of Delaware No Drawing. Application April 20, 1951, Serial No. 222,140

17 Claims. (Cl. 260—475)

This invention relates to improved methods of conducting organic condensation synthesis reactions. More particularly, this invention relates to an improved method of preparing organic esters, acetals, and unsaturated ethers having a total carbon number of 6 to 40 carbon atoms by condensation reactions, utilizing a sulfur-containing catalyst selected from the group consisting of alkyl mercaptans and alkyldithioalkanes.

This application is a continuation in part of U. S. application No. 61,913 filed November 24, 1948, since issued as U. S. Patent No. 2,578,724 dated December 18, 1951.

Organic synthesis condensation reactions, i. e., those involving the condensation of two or more molecules of organic compounds with the evolution of water, such as esterification, synthesis of acetals, unsaturated ethers, etc., are generally catalyzed by the addition of mineral acids or strong organic acids such as trichloroacetic or toluene sulfonic. While these are generally effective catalysts, they may, in certain cases, be subject to certain disadvantages such as producing excessive discoloration of the products and polymerization.

In addition, these catalysts result in the formation of sulfur bodies in the product, which, because of their high boiling point, cannot readily be removed from the products.

It has now been found that particular sulfur-containing catalysts, i. e., those selected from the group consisting of alkyl mercaptans and alkyldithioalkanes, are ideally adapted to overcome the beforementioned difficulties. The indicated reactions can be conducted in the manners generally known in the art, except for the utilization of the catalysts of this invention as taught.

The catalysts of this invention are stable under normal reaction conditions and do not react with a system, as contrasted to the use of toluene sulfonic acid. For example, use of toluene sulfonic acid as catalyst in esterification reactions leads to production of high-boiling sulfonates with resultant contamination of the products with sulfur.

The particular catalysts of this invention can also be chosen of a boiling point such that they boil at a lower point than the desired product. They can thus be readily removed, leaving a sulfur, catalyst-free product, as contrasted with other catalysts of the art.

Those alkyl mercaptans and alkyldithioalkanes having a total carbon number in the range of 6 to 16 are preferable. Particularly effective and desirable compounds of the class of compounds of this invention are lauryl mercaptan, n-heptyl mercaptan, iso-octyl mercaptan, and n-amyl disulfide. The catalysts are utilized in the reaction system in a range of 0.01 to 0.10 weight per cent based on the component not present in excess (e. g., on aldehyde in ether synthesis or on acid in certain esterifications). In this small quantity they have activities comparable to toluene sulfonic acid, and are possessed of none of the beforementional difficulties of the latter. The reagents function as solvents, but auxiliary solvents may be employed if desired.

As stated above, the reactions are conducted in conventional manner, except for the modification of the indicated catalysts used in the indicated manner.

Esters, and particularly the phthalic acid esters, can thus be prepared from alcohols of the desired carbon number by any of the otherwise conventional methods, as by reacting the alcohol with the acid, or with acid anhydride, or by first transforming the alcohol into an alkyl halide and then reacting the latter with a metal salt of the selected acid. For example, phthalate esters may be prepared efficiently by reacting about 2 mols of a suitable alcohol with 1 mol of phthalic anhydride in the presence of the catalysts of this invention and using a solvent such as benzene as entrainer.

The catalytic esterification reaction is carried out at a pot temperature of about 100–200° C., depending upon the boiling point and amount of entrainer. It can thus be seen that the esterification reaction is carried out in the conventional manner except for the incorporation of the indicated catalysts in the reaction mixture. The iso-octyl phthalate ester itself boils at about 200–220° C., at 2 mm. of mercury pressure. The reaction is carried out in corrosion resistant equipment such as glass-lined equipment.

The process to yield the acetals and unsaturated ethers is also quite simple and economical in operation. The alcohol and aldehyde, which can have either the same or different carbon skeleton structures and are preferably of the more desirable branched chain carbon structures, are heated together under heating conditions such as might be employed for an esterification. Temperatures of from 80° C. to 235° C. are conveniently employed. Entrainers permit of lower temperatures and the higher temperatures are employed in the absence of auxiliary entrainers. Mixtures of aldehydes and alcohols such as might be obtained from synthetic methods are conveniently employed. The temperature must be adjusted properly such that the unsaturated ether may be formed at a sufficiently great reaction rate as to make the operation of a practical nature. Unreacted starting materials, catalyst and certain lower boiling by-products including water can be removed from the system by distillation, since normally the unsaturated ether will be the highest boiling material present in any substantial amount. This affords a convenient method for isolation of the product. Unreacted aldehyde and alcohol along with catalyst can be removed by volatilization from the reaction mixture and can, of course, be subjected to the reaction again to increase conversion to the unsaturated ether. The most practical procedure is to carry out at least the latter part of the distillation under reduced pressure to reduce product decomposition and tar formation. The quantity of water which is produced during the initial stages of the reaction period prior to distillation of the product can be used as a convenient indication of the extent of completion of the reaction. If it is desired to remove the unsaturated ether product from the reaction mixture by distillation, this should be done at reduced pressures to avoid decomposition.

The molar ratios of the reactants are not critical and various mixtures of aldehydes and alcohols may be conveniently employed. Any reasonable excess of either aldehyde or alcohol is readily recycled. A moderate excess of alcohol appears to favor the reaction. For instance, the aldehyde to alcohol mol ratio may be advantageously held at about 1:3.

Since water is a by-product, the reaction is facilitated by removal of water and gives increased unsaturated ether formation. This water removal may be conveniently handled by addition of an entrainer such as benzene, toluene, or the xylenes. The water is thus removed as one component of an azeotrope, the components of the azeotrope are separated, and the entrainer subsequently recycled. Catalyst may be recycled with unconverted components. This makes advantageous the employment of a catalyst which boils within the range of unconverted components.

The aldehydes and alcohols which may be converted to the unsaturated ethers and acetals by this improved technique include any of those of the aliphatic series. For best yields of the acetals and unsaturated ether, it has been discovered that the more highly branched aldehydes and alcohols are much to be preferred.

The reactants employed need not be chemically pure components but can be operated with mixtures. The process is especially useful for use on synthetic mixtures such as can be produced by reacting various higher olefins with carbon monoxide and hydrogen, a reaction commonly known as the Oxo reaction. Aldehydes and alcohols from other types of synthetic sources may also be used. The present process offers a very advantageous method for converting crude distilled fractions which contain both higher alcohols and aldehydes such as those having six to ten carbon atoms to highly useful and relatively easily isolatable product. This use of crude mixtures of reactants is, in fact, one of the outstanding advantages of this novel process. The process is also one of great simplicity, both in the operational procedure and in the apparatus necessary.

The unsaturated ethers and acetals are identified in the usual way by determination of the bromine number, molecular weights and elemental analyses. Infra red analyses show the characteristic olefinic band, as well as the ether band. The hydroxyl and carbonyl bands are substantially absent. Comparison of the elemental analysis with the calculated values gives an additional check on the structure of the compounds formed.

This invention is illustrated by the following examples:

*Example I.—Sythesis of acetals and unsaturated ethers with entrainers*

Mixtures of the specified $C_8$ alcohol, $C_8$ aldehyde and catalyst were refluxed in all glass apparatus consisting of a boiling flask of appropriate size, water trap and condenser. Entrainers such as benzene or toluene were employed in some instances. The water elimination was measured as a function of time and conversions of aldehyde calculated on this basis. The reaction rates were taken as 10 times the reciprocal of the time required to attain 50% conversion of aldehyde. Typical results are as follows:

| Catalyst | None | Toluene Sulfonic Acid | Lauryl Mercaptan | n-Heptyl Mercaptan | Iso-Octyl Mercaptan | n-Amyl Di-sulfide |
|---|---|---|---|---|---|---|
| Catalyst Conc., Wt. Percent on Ald | | 0.013 | 0.076 | 0.091 | 0.066 | 0.065 | 0.10 |
| Alcohol | (1) | (1) | (1) | (1) | (1) | (1) | (1) |
| Aldehyde | (2) | (2) | (2) | (2) | (2) | (2) | (2) |
| Mol. Ratio, Alc./Ald | 1.84 | 1.75 | 1.88 | 1.5 | 1.5 | 1.5 | 1.5 |
| Entrainer | (3) | (3) | (3) | (3) | (3) | (3) | (3) |
| Temp., °F | 225 | 217 | 209 | 213 | 212 | 212 | 225 |
| Time, Min. for 50% Conv. of Ald | ∞ 4 | 83 | 33 | 36 | 34 | 38 | 72 |
| Rate $10 \times \frac{1}{t_{50}}$ | 0 | 0.12 | 0.33 | 0.27 | 0.29 | 0.26 | 0.14 |

1 2-ethyl hexanol.
2 2-ethyl hexaldehyde.
3 Benzene.
4 (No reaction.)

It is apparent that equivalent results were obtained with the catalysts of this invention in conversion rates as compared with the action of toluene sulfonic acid.

*Example II.—Synthesis of acetals and unsaturated ethers without entrainers*

Similar reactions were conducted as in Example I, except that in this example no entrainers were employed. The results follow:

| Catalyst | n-Heptyl Mercaptan | | iso octyl Mercaptan | | n-amyl disulfide | iso octyl disulfide |
|---|---|---|---|---|---|---|
| Catalyst Con., Wt. Percent on Aldehyde | 0.006 | 0.01 | 0.0088 | 0.016 | 0.032 | 0.12 |
| Alcohol | (1) | (1) | (1) | (1) | (1) | (1) |
| Aldehyde | (2) | (2) | (2) | (2) | (2) | (2) |
| Mole ratio, Alc./Ald | 2.8 | 2.8 | 2.8 | 3.0 | 2.9 | 2.9 |
| Temp., °F | 350-450 | 350-450 | 350-450 | 350-450 | 350-450 | 350-450 |
| Time, Min. for 50% Ald. Conv. | 120 | 32 | 46 | 20 | 84 | 33 |
| Rate $10 \times \frac{1}{t_{50}}$ | 0.08 | 0.31 | 0.22 | 0.50 | 0.12 | 0.30 |

1 2-ethyl hexanol.
2 2-ethyl hexaldehyde.

These results show that good conversion rates were obtained without the use of entrainers.

*Example III.—Esterification*

The esterification of phthalic anhydride with a $C_8$ alcohol, namely 2-ethyl hexanol was carried out in a similar manner, the conversion of phthalic anhydride being measured by water elimination. Since it is desirable to attain 100% conversion of phthalic anhydride in this reaction, the catalytic effect is measured in terms of the time required to attain 100% conversion. No entrainer was employed in this work.

| Catalyst | None | n-Heptyl Mercaptan | |
|---|---|---|---|
| Catalyst Conc., Wt. Percent on Anhyd | | 0.13 | 0.39 |
| Mol Ratio, Alc/Anhyd | 3.6 | 3.6 | 3.6 |
| Temp., °F | 380-410 | 380-410 | 380-410 |
| Time, Min. for 100% Conv. of Anhyd | >370 | 312 | 280 |

This example illustrates the efficacy of the catalysts of this invention.

The advantages of the catalysts of this invention can be seen to include activities equivalent to that of toluene sulfonic acid, no coloration of products, and the facilitation of the obtaining of a pure product.

The acetals produced have utility in other synthesis reactions such as in the preparation of resins and chemical additives. The esters are well known as among the best plasticizers for various resins. The unsaturated ethers are useful as modifiers in polymerization reactions and as fuel oil additives.

It will be understood further that the foregoing examples have been given merely for purposes of illustration, but that other modifications of the present invention are possible without departing from the scope of the appended claims.

What is claimed is:

1. In a process for the preparation of an organic compound of 6 to 40 carbon atoms per molecule selected from the group consisting of acetals, unsaturated ethers and esters by a reaction wherein an alcohol is condensed with a member of the group consisting of aldehydes, organic carboxylic acids and organic carboxylic anhydrides and wherein water is split out, the improvement which comprises employing a sulfur-containing catalyst selected from the group consisting of alkyl mercaptans and alkyl dithioalkanes, both having 6 to 16 carbon atoms per molecule.

2. A process according to claim 1 wherein the catalyst boils in the range of the unconverted reactants.

3. In a process for the preparation of an oxygenated organic compound selected from the group consisting of acetals and unsaturated ethers by a condensation reaction of a $C_8$ alcohol and a $C_8$ aldehyde, the improvement which comprises employing a sulfur-containing catalyst selected from the group consisting of alkyl mercaptans and alkyl dithioalkanes, both having a carbon number in the range of 6 to 16 carbon atoms.

4. A process according to claim 3 wherein the catalyst boils in the range of the unconverted reactants.

5. The process of claim 3, including the additional step of taking overhead by distillation evolved water and the catalyst and thereafter isolating the oxygenated organic compound product.

6. In a process for the preparation of an ester utilizing a condensation reaction of an organic acid derivative selected from the group consisting of phthalic acid and phthalic anhydride with a $C_8$ alcohol, the improvement which comprises employing a sulfur-containing catalyst selected from the group consisting of alkyl mercaptans and alkyl dithioalkanes, both having a carbon number in the range of 6 to 16 carbon atoms.

7. The process of claim 6, including the additional step of taking overhead by distillation evolved water and the catalyst and thereafter isolating the ester product.

8. A process as in claim 6, in which the catalyst is lauryl mercaptan.

9. A process as in claim 6, in which the catalyst is n-heptyl mercaptan.

10. A process as in claim 6, in which the catalyst is iso-octyl mercaptan.

11. The process of claim 6 in which the ester prepared is di-iso-octyl phthalate, the acid is phthalic acid and the alcohol is iso-octyl alcohol.

12. A process as in claim 3, in which the catalyst is lauryl mercaptan.

13. A process as in claim 3, in which the catalyst is n-heptyl mercaptan.

14. A process as in claim 3, in which the catalyst is iso-octyl mercaptan.

15. A process as in claim 3, in which the catalyst is n-amyl disulfide.

16. A process for the preparation of di(2-ethyl hexyl) phthalate which comprises reacting phthalic anhydride and 2-ethyl hexanol in the presence of n-heptyl mercaptan, taking overhead by distillation evolved water and the n-heptyl mercaptan and thereafter isolating the di(2-ethyl hexyl) phthalate product.

17. A process for the preparation of di(2-ethyl hexyl) phthalate which comprises reacting phthalic anhydride and 2-ethyl hexanol in the presence of iso-octyl mercaptan, taking overhead by distillation evolved water and the iso-octyl mercaptan and thereafter isolating the di(2-ethyl hexyl) phthalate product.

References Cited in the file of this patent

UNITED STATES PATENTS

| Number | Name | Date |
|---|---|---|
| 1,907,822 | James | May 9, 1933 |
| 2,045,560 | Fenske | June 23, 1936 |
| 2,482,725 | Bramwyche et al. | Sept. 30, 1949 |